US006968094B1

(12) United States Patent
Gallagher

(10) Patent No.: US 6,968,094 B1
(45) Date of Patent: Nov. 22, 2005

(54) METHOD OF ESTIMATING AND CORRECTING CAMERA ROTATION WITH VANISHING POINT LOCATION

(75) Inventor: Andrew C. Gallagher, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 633 days.

(21) Appl. No.: 09/663,056

(22) Filed: Sep. 15, 2000

Related U.S. Application Data

(60) Provisional application No. 60/192,400, filed on Mar. 27, 2000.

(51) Int. Cl.$^7$ .............................................. G06K 9/32
(52) U.S. Cl. ...................................... 382/296; 382/295
(58) Field of Search .............................. 382/296, 151, 382/290, 289, 288, 295

(56) References Cited

U.S. PATENT DOCUMENTS

| 5,325,470 | A | * | 6/1994 | Sumino et al. | ............. 345/421 |
| 5,798,761 | A | * | 8/1998 | Isaacs | ........................ 345/419 |
| 5,967,979 | A | * | 10/1999 | Taylor et al. | ................ 600/407 |
| 5,990,900 | A | * | 11/1999 | Seago | ......................... 345/427 |
| 6,011,585 | A | | 1/2000 | Anderson | ................... 348/272 |
| 6,226,004 | B1 | * | 5/2001 | Nishihara | .................... 345/420 |
| 6,591,005 | B1 | * | 7/2003 | Gallagher | ................... 382/154 |

OTHER PUBLICATIONS

Chen et al., "Skew detection and reconstruction based on maximization of variance of transition-counts", *Pattern Recognition* 33 (2000), pp. 195-208.
Barnard, "Interpreting Perspective Images", *Artificial Intelligence* 21 (1983), Elsevier Science Publishers, B.V., pp. 435-462.
Lutton et al., "Contribution to the Determination of Vanishing Points Using Hough Transform", *IEEE Transactions on Pattern Analysis and Machine Intelligence*, vol. 16, No. 4, Apr. 1994, pp. 430-438.

* cited by examiner

*Primary Examiner*—Bhavesh M. Mehta
*Assistant Examiner*—Dennis Rosario
(74) *Attorney, Agent, or Firm*—Stephen H. Shaw

(57) ABSTRACT

A method of generating an image transform for modifying a digital image, that includes the steps of: detecting a vanishing point related to the selected image; determining a preferable vanishing point location, and generating an image transform based on the vanishing point location and the preferable vanishing point location. In another embodiment, the present invention provides a method for detecting an amount of rotation between the vertical axes of a scene and an image of the scene, that includes the steps of: detecting a set of vanishing points related to the image; selecting a set of vanishing points corresponding to a vertical axis of the scene based on a predetermined criteria; and using the selected vanishing points to detect the rotation of the image.

15 Claims, 6 Drawing Sheets

METHOD OF ESTIMATING AND CORRECTING CAMERA ROTATION WITH VANISHING POINT LOCATION

CROSS REFERENCE TO RELATED APPLICATIONS

Reference is made to U.S. Provisional Ser. No. 60/192,400, filed Mar. 27, 2000, entitled Correction of Small Image Rotations Based on Vanishing Point Detection by Andrew C. Gallagher.

FIELD OF THE INVENTION

The invention relates generally to the field of image processing. More specifically, the invention relates to estimating and correcting for unintentional rotational camera angles that occur at the time of image capture, based upon the captured image's corresponding location of its vanishing points. Furthermore, the invention relates to image warping; the process of warping an image in a manner that causes the vanishing points of the image to relocate.

BACKGROUND OF THE INVENTION

Conventional consumer cameras (both film and digital) capture an image having a rectangular imaging area. For cameras using 35 mm film, the horizontal dimension of the imaging area is approximately 36 mm and the vertical dimension of the imaging area is approximately 24 mm.

Many photographers find it very difficult to hold a camera level when capturing a photograph. A photographer often pivots the camera slightly about the optical axis (whereby the optical axis is defined as an axis passing through the center of the image capture frame and the center of the camera lens). These small rotations are generally unintentional and may occur because conventional consumer cameras are lightweight, for example, the popular Single-Use cameras. Rotations about the optical axis give the appearance that the subjects in the photograph are off-centered, leaning, or tilted.

U.S. Pat. No. 6,011,585 issued Jan. 4, 2000 to Anderson, entitled Apparatus and Method for Rotating the Display Orientation of a Captured Image describes a method of determining image format and orientation from a sensor present in the camera at the time of image capture. Whereas, this sensor can enable one to determine the orientation or format of a captured image, it cannot lead to detecting a small amount of camera rotation. Instead, the sensor identifies the major image orientation (in increments of 90 degrees) by determining which side of an image corresponds with the "top" of the image. In addition, the Anderson method necessitates a sensor of this sort be present within a camera.

Lutton et al. (in "Contribution to the Determination of Vanishing Points Using Hough Transform," *IEEE Trans. Pattern Analysis and Machine Intelligence*, Vol. 16, No. 4, pp. 430–438, Apr. 1994) attempts to detect the vertical direction of an image. The Lutton et al. article teaches one to select the direction that is orthogonal to the most directions in the scene. The implicit assumption is that the scene will contain many horizontal lines. However, this is not always the case. Additionally, the Lutton analysis is performed with a possibly large number of line segments, rather than vanishing points. The Lutton method requires a great deal of processing and may be computationally costly.

Some existing systems detect and correct a skewed image. These systems are primarily in the field of document imaging. Nevertheless, documents have a fairly well defined structure, as opposed to more unpredictable consumer type photographs. Another sharp contrast between document imaging correction and photographic imaging correction is that vanishing point detection is not used in the field of document imaging, nor is vanishing point detection required.

Pending U.S. application Ser. No. 09/281,574, filed Mar. 30, 1999 by Gallagher, entitled A Method for Modifying the Perspective of a Digital Image, shows a process for compensating from the perspective of image capture. However, this solution cannot lead to compensating for camera rotation about the optical axis. The perspective of image capture relates to tipping the camera in the up and down direction (i.e. about the x-axis), which is much different than rotating a camera about the optical axis. Therefore, pending U.S. application Ser. No. 09/281,574 is limited to describing a method of correction exclusively unique to the problem of camera rotation about the x-axis.

Consequently, a need exists for overcoming the above described drawbacks. More specifically, a need exists for determining slight image orientation changes.

SUMMARY OF THE INVENTION

The need is met according to the present invention by providing a method of generating an image transform for modifying a digital image, that includes the steps of: detecting a vanishing point related to the selected image; determining a preferable vanishing point location, and generating an image transform based on the vanishing point location and the preferable vanishing point location.

In another embodiment, the present invention provides a method for detecting an amount of rotation between the vertical axes of a scene and an image of the scene, that includes the steps of: detecting a set of vanishing points related to the image; selecting a set of vanishing points corresponding to a vertical axis of the scene based on a predetermined criteria; and using the selected vanishing points to detect the rotation of the image.

The present invention has an advantage of improving the method of correcting for small angles of camera rotation, i.e. camera tilt.

BRIEF DESCRIPTION OF THE DRAWINGS

The subject matter of the invention is described with reference to the embodiments shown in the drawings.

DETAILED DESCRIPTION OF THE INVENTION

In the following description, the present invention will be described in the preferred embodiment as a method. Those skilled in the art will readily recognize that the equivalent of such a method may also be constructed as hardware or software within the scope of the invention.

Figure 1:
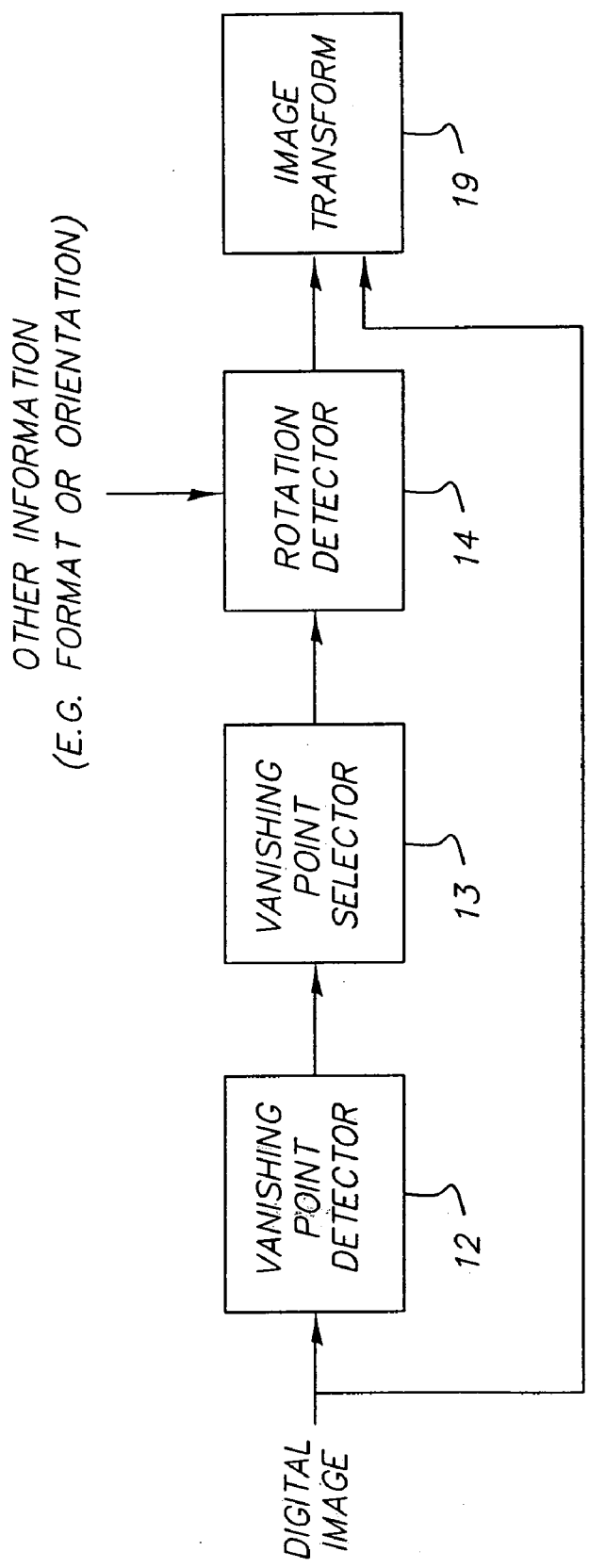
FIG. 1 is a schematic representation of the system providing a method of determining the amount of rotation present in an image and a means for correcting the rotation.

FIG. 1 shows a block diagram of the present invention. The purpose of the present invention is to estimate the amount of rotation of a camera relative to the scene at the time of image capture, based upon a digitized representation of an image. The source of the digitized image is irrelevant. The digitized image may be a scan of a film negative, a scan of a photograph, or an image captured with a digital camera. It should be well understood that in cases where the digitized image is a scan of a hardcopy image that the rotation of the digitized image corresponds to the rotation of the source image. That is, if a photograph was captured with a camera that was tilted by β degrees, then the corresponding scan of that photograph (or the scan of the photographic negative) will also be tilted by β degrees. Thus, the method described herein may be used to automatically determine the amount of camera rotation at the time of capturing the photograph, for example; by first digitizing the photograph and then analyzing the resulting scan with the method of the preferred embodiment. In this case, the source image is the photograph and the digital image is a result of the scan. It should be further understood that the source image may for example be a large resolution digital image. This source image may then be decimated to generate the digital image that the method of the present embodiment operates upon. Again, the result from the present invention applies to both a source image and a digital image. Note that the preferred embodiment is described with reference to digital images having a dimension of 512 pixels by 768 pixels, although those skilled in the art will recognize that many image resolutions may be utilized with equal success. For example, the present invention is also suitable for processing a digital image having dimensions of 512 pixels by 512 pixels. Note also that the terms "digitized image", "digital image", and "image" are used synonymously throughout this description.

Vanishing points are a useful feature for determining the amount of rotation of an image because of the many vertical parallel lines associated with human construction. Despite a left to right positioning of the camera (or other image capture device), the vanishing point associated with the vertical scene lines nearly always falls near the vertical axis of the image.

Figure 2:
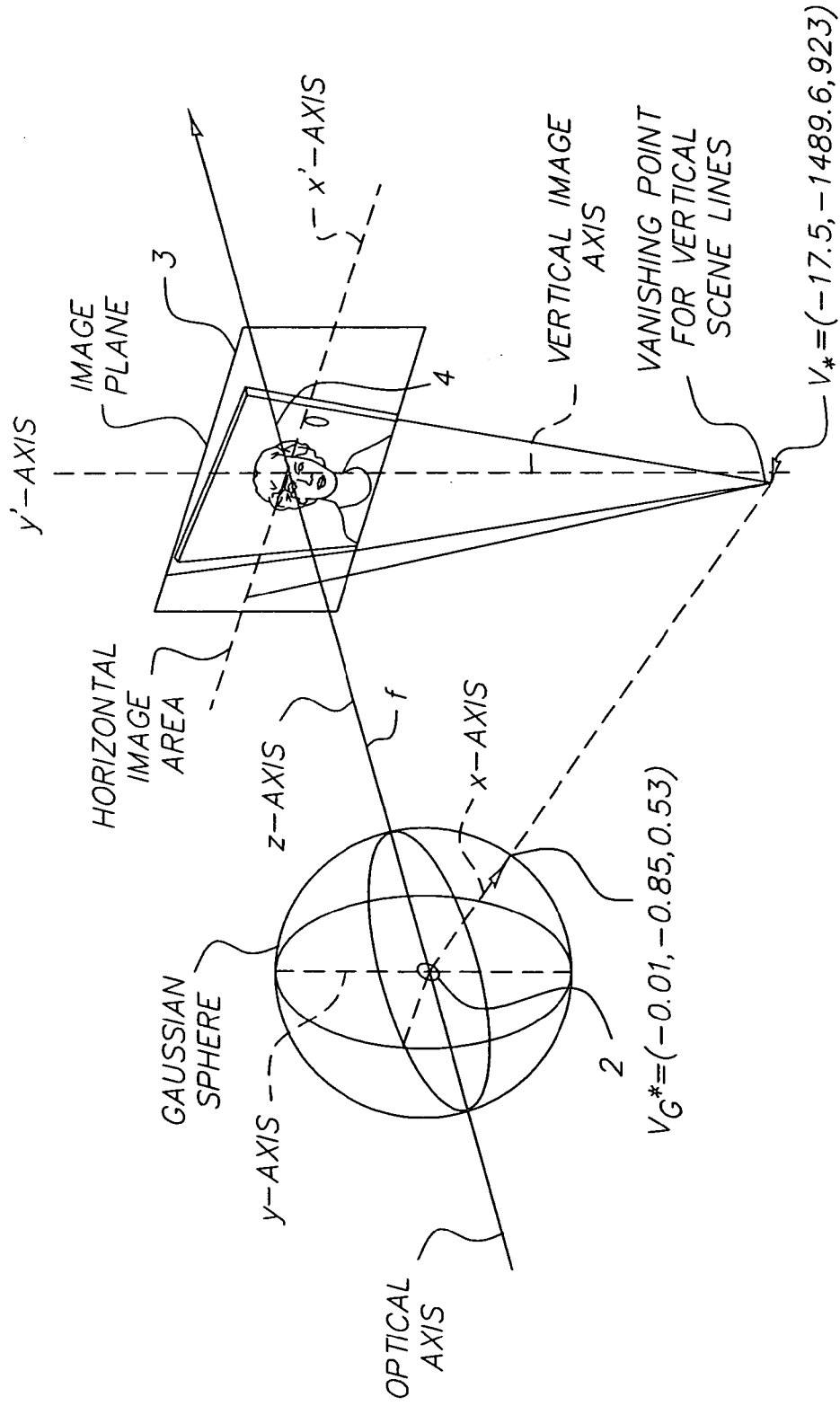
FIG. 2 is a schematic of the reference systems employed to describe the present invention.

FIG. 2 shows a reference system employed with the present invention. A focal point 2, representing the approximate location of the focal point of the lens used to capture the image, is located a distanced from the image plane 3. The focal point 2 represents the center of a Gaussian sphere. The x-axis and y-axis define the dimensionality of the image plane 3. The z-axis is also defined as the "optical axis" of the system. The x'-axis and the y'-axis define a plane that is parallel to the image plane 3. The image origin 4 is defined as the point of intersection of the image plane with the optical axis, and is given in Cartesian coordinates as (0,0,f). Generally, the image origin is assumed to be at the center of the distribution of pixels comprising the digital image, although this assumption may not be correct. In fact, if the camera is constrained to only pivot up or down (pivoting solely about the x-axis), the vanishing point associated with vertical scene lines must fall on the vertical axis of the image. For many photographers, a pleasing captured image results by maintaining a level camera during shooting the image. Attempting to keep the camera level applies whether the camera is held by hand or placed on a tripod or some other mechanical device. Because it is desirable to capture an image with a camera held level (i.e., pivoting solely about the x-axis), and such practice results in the vanishing point most closely associated with the image's vertical scene lines to fall on the vertical axis of the image, consequently, the vertical axis of the image is defined as a preferable vanishing point location for achieving a user desired image composition. In other words, the captured image is preferably represented as a level depiction of the captured scene with respect to the vertical lines within the scene. However, if the camera is rotated about the optical axis (the z-axis), then the vanishing point associated with vertical scene lines will not fall on the vertical axis of the image. However, the angle from the vanishing point corresponding to the vertical scene lines to the vertical axis of the image is equivalent to the amount that the camera was rotated about the optical axis.

In a human-made construction, there are also a large number of horizontal lines (lines orthogonal to the vertical lines). If these horizontal lines happen to be parallel to the image plane (orthogonal to the optical axis), then a vanishing point for the horizontal lines will occur at infinity on the horizontal axis of the image. However, depending upon the position of the photographer, it is very likely that the horizontal scene lines will not be parallel to the image plane. If this condition exists and the camera is tilted about the x-axis, then the vanishing point associated with the horizontal scene lines will not fall on either axis of the image plane. Thus, the vanishing point associated with horizontal lines in the scene may fall on the horizontal axis of the image, but because of the scene composition it is just as likely that the vanishing point will fall elsewhere. Hence, the vanishing point location corresponding to the horizontal lines in the scene is not constrained to fall near an image axis, but it is highly likely that the vanishing point associated with the vertical lines of the scene will fall near the vertical axis of the image. Conversely, if a vanishing point is located near an image axis, it is far more likely that this vanishing point corresponds to a set of vertical scene lines than a set of horizontal scene lines.

FIG. 2 discloses an example of expressing a vanishing point location. First, a vanishing point may be expressed as a location on the image plane. The vanishing point v may be expressed as the point at location $v=(x_0, y_0, f)$. Such a representation of the vanishing point location performs well when the vanishing point is located near the image origin, however, the coordinate locations along the x-axis and the y-axis may grow quite large. Another aspect of the invention illustrated in FIG. 2 is a vanishing point representation scheme, commonly used in the field of vanishing point detection. In this representation, the vanishing point is represented with a Gaussian mapping. As such, each location v on the image plane has a unique location $v_G$ on the Gaussian sphere. The relationship between the vanishing point location on the image plane $v=(x_0,y_0,f)$ and the vanishing point vector $v_G$ determined by the Gaussian mapping is given with the equation:

$$v_G = \frac{v}{|v|}$$

Likewise, if the vanishing point vector $v_G=(x_G, y_G, z_G)$ is known and the vanishing point location in the image plane is desired, then the following projection is used:

$$v = \frac{fv_G}{z}$$

One can easily see that the vanishing point vector $v_G$ is a unit vector extending in the direction from the focal point to the vanishing point location in the image plane. With reference to FIG. 2, the image plane is positioned f distance from the optical origin of the system. Normally f distance represents the focal length. If the focal length is unknown, then a reasonable guess may be used. In one embodiment, f is the diagonal length of the imager. For example, where an image has a dimension of 512 pixels by 768 pixels, f equals 923. The vanishing point on the image plane may then be represented as the unit vector that points from the optical system's origin to the vanishing point on the image plane. This vector is of length one and may be described as the coordinates of the intersection of a Gaussian sphere (a sphere of radius 1.0) centered at the optical system origin (the focal point) and the line passing through both the optical system origin and the vanishing point on the image plane. This vector representation of the vanishing point is advantageous because it contains the entire space of the image plane.

In one embodiment of the invention as shown in FIG. 1, a digital image is input to a vanishing point detector 12. The purpose of the vanishing point detector is to identify the locations of the vanishing points of the digital image. As is well known in the art, a vanishing point is the result of the perspective projection of the three dimensional scene onto a two dimensional image plane. A vanishing point refers to the point in the image plane (a two dimensional projection of the three dimensional scene) where parallel lines in the scene meet. Vanishing points generally only have relevance for images containing images of a structure containing at least two line segments, generally from man-made structures. Several authors have documented methods of automatically locating the vanishing points of an image. For example, S. Barnard, "Interpreting Perspective Images," *Artificial Intelligence*, vol. 21, pp. 435–462, 1983. A preferred automated technique is disclosed in pending U.S. Provisional Patent Application Ser. No. 60/192,195 filed Mar. 27, 2000 by Gallagher, entitled Vanishing Point Detection by Training with Ground Truth Data, which is incorporated by reference. In addition, the vanishing point detector may include manually identifying the vanishing points using operator input. The vanishing point detector 12 outputs the locations of all vanishing points identified for the image. Characteristically, the number of vanishing points determined for a single image is not greater than three, although this should not be viewed as a limitation. As described below, the vanishing points determined for the image are output in the form of vanishing point vectors. Assuming that M vanishing points are determined for the digital image, the output of the vanishing point detector may be represented as $v_{Gm}$, where m ranges from 1 to M. Alternatively, it is possible that zero vanishing points may be determined for the digital image. In this event, then the present invention cannot draw any conclusions regarding image rotation from the location(s) of vanishing point(s).

If M>0, then the vanishing point vectors detected by the vanishing point detector 12 are input to a vanishing point selector 13. The purpose of vanishing point selector 13 is to determine those vanishing points that may be useful for determining the amount of rotation (i.e. the rotation of the camera from the level position at the time of capture) of the digital image by using the information contained in the M vanishing point vectors.

The vanishing point selector 13 determines if any of the M vanishing points associated with the digital image may be used to determine the amount of rotation of the digital image. Those vanishing points which may be used to determine the format of the image are referred to as "rotation candidate vanishing points."

In the preferred embodiment, a rotation candidate vanishing point is any vanishing point having an associated vanishing point vector $v_G=[x_G, y_G, z_G]$ meeting the either of the following two conditions:

$|x_G|>T_1$       1.

$|y_G|>T_1$       2.

Figure 6:
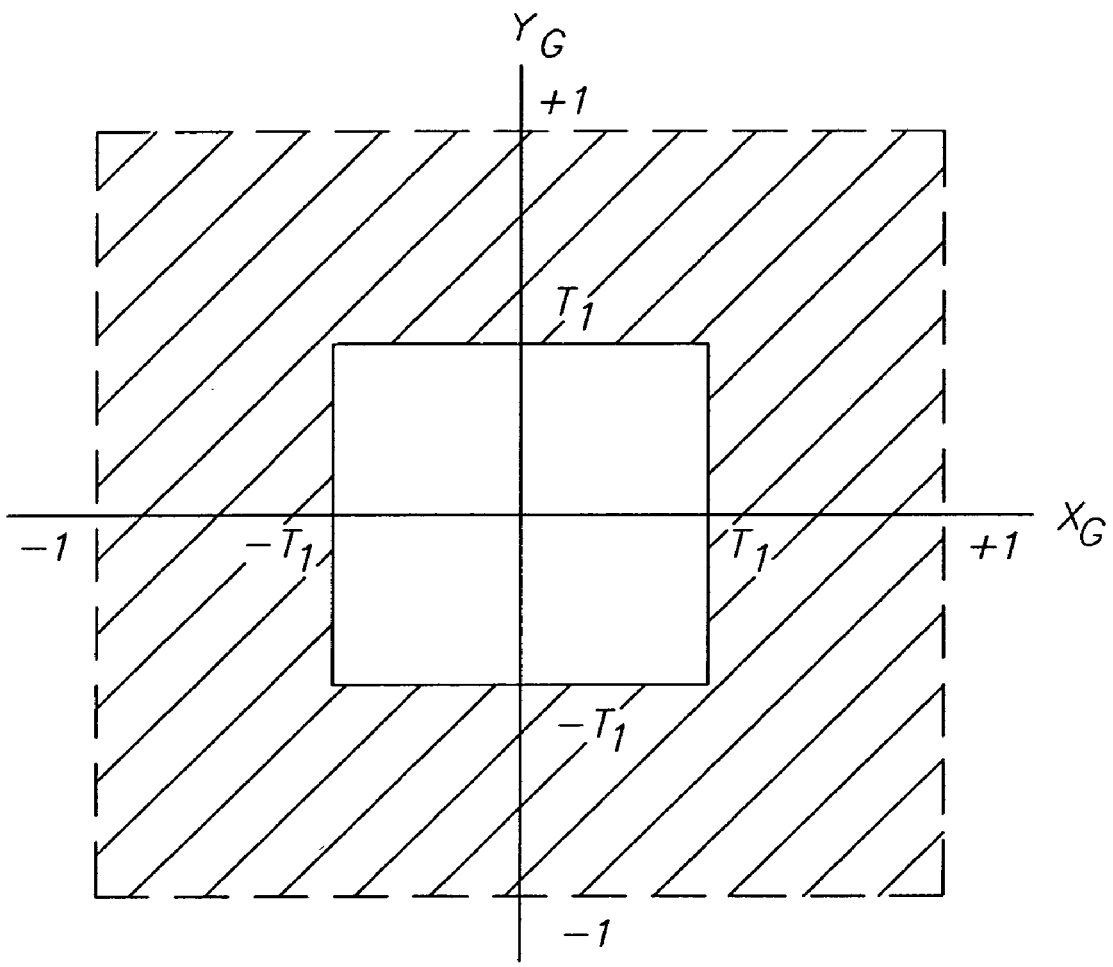
FIG. 6 is a diagram useful in describing the present invention.

Values of $T_1$ between 0.3 and slightly less than 1 are useful in practicing the present invention. In the preferred embodiment, $T_1$ is set at 0.5. The regions in the $x_G$, $y_G$ plane in which such vanishing points lie are illustrated by cross hatching in FIG. 6. The vanishing point selector 13 outputs N (where N is between 0 and M) format candidate vanishing points.

Alternatively, it should be well understood that those skilled in the art can easily modify the above stated rules from classifying a vanishing point vector $v_G$ as a rotation candidate vanishing point. For example, a vanishing point vector $v_G$ may be classified as a rotation candidate vanishing point if the following condition is met:

$\sqrt{x_G^2+y_G^2}>T_2$

Values of $T_2$ between 0.3 and slightly less than 1 are useful in practicing the invention.

If an image has zero rotation candidate vanishing points (if N=0), then the present invention does not detect the rotation of the digital image using a feature based on vanishing point location.

If there is at least one rotation candidate vanishing point corresponding to the digital image, then the rotation candidate vanishing point is output from the vanishing point selector 13 and input to a rotation detector 14. Note that other information may also be input to the rotation detector 14 in order to aid the determination process. For instance the format (an identification of the vertical axis of the image as will be described herein) or orientation (an identification of the top of the image) may also be input to the rotation detector 14 for the purpose of determining the rotation amount. The operation of the rotation detector 14 is to determine the angle β between the vertical axis of the image and the vector pointing from the image origin to the vanishing point corresponding to the vertical lines in the scene. In other words, the angle β corresponds to the amount of rotation of the capture device (for example a camera) about the optical axis.

The angle of rotation for each of the N rotation candidate vanishing points is computed by the rotation detector 14 by first projecting the vanishing point under consideration to the xy-plane. This is accomplished according to the following equation:

$$v_{Gxy} = \frac{[x_G, y_G, 0]}{\sqrt{x_G^2 + y_G^2}}$$

The vector $v_{Gxy}$ is a vector which generally points in a direction parallel to the vertical axis of the scene.

Next, the angles γ are determined to be the angles between the vector $v_{Gxy}$ and both the positive and negative vertical axes of the image. The vertical axis of an image is the axis on the image plane parallel to either the x-axis or the y-axis which also passes through the "top" and "bottom" of the image. The vertical axis of the image will be further explained herein below. If the vertical axis of the image is known, then the angles γ are computed by taking the inverse cosine of the dot product of the two vectors, as is well known in the art. For example, if the y-axis is the vertical axis of the image, then the angles γ may be determined as:

γ=sign($x_G y_G$)cos$^{-1}$($v_{Gxy}$·[0,1,0])

γ=sign($x_G y_G$)cos$^{-1}$ ($v_{Gxy}$·[0,-1,0])

where sign($x_G y_G$) represents the sign (−1 or +1) of the product of $x_G$ and $y_G$. For example, when $x_G$ and $y_G$ are either both negative or both positive, the sign($x_G y_G$)=1. Alternatively, when only $x_G$ or $y_G$ is negative then sign ($x_G y_G$)=−1.

If the vertical axis of the image is not known by the rotation detector 14, then the angles γ are determined to each image axis (for a total of four angles γ). Thus, for each rotation candidate vanishing point, several angles γ are determined as the angle between the vector $V_{Gxy}$ representing the projection of the vanishing point onto the xy-plane and the image axes. The angle β is determined to be the smallest (in an absolute value sense) of these angles γ. Note that the angle β may be positive or negative in magnitude, indicating the direction of camera rotation. The output of the rotation detector 14 is the angle β. Note that the angle β is expected to be equal to or less than π/4.

FIG. 1 shows that the identification of the vertical axis of the digital image is output from the rotation detector 14 and passed to an image transform 19. According to an alternative embodiment of the invention, this image transform may also receive various other parameters, including the digital image itself. The operation of the image transform 19 may be any number of image transformations that benefit from knowledge of image rotation.

In an example of the use of the rotation information, the angle β of the digital image may be stored as metadata by the image transform 19. Metadata is generally defined as data corresponding to an image apart from actual pixel values.

Additionally, the function of the image transform 19 may account for the rotation of the image by performing an image rotation in the opposite direction. Image rotation is well known by those skilled in the art of image processing. The amount the digital image must be rotated is given by the negative of β.

In another embodiment, the vanishing point vector is interchangeable with the vanishing point location given in Cartesian coordinates.

Figure 3A:
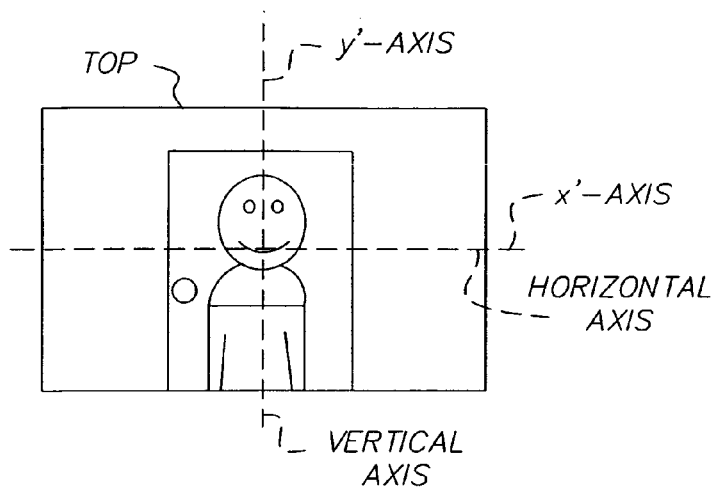
FIGS. 3A–C show several examples of images with different formats and orientations.

FIG. 3 shows several image examples useful for defining terms used herein. FIG. 3A shows an example image of a person. The top of the image is defined as the side of the image that was in the "up" direction from the photographer's perspective at the time of image capture. Identification of the top of an image solves the problem of orientation. In the case of FIG. 3A, the top of the image clearly corresponds to the top of the subject's head. Note that the bottom of an image is always the image side opposite the image top. Also shown in FIG. 3A are axes parallel to the x-axis and the y-axis passing through the image origin. These axes have herein been defined as the x'-axis, and the y'-axis, respectively, and shall herein be known collectively as image axes.

Note that the vertical axis of the image is that line that passes through the top and bottom of the image, as well as the image origin and coincident with either the x'-axis or the y'-axis. The vertical axis of the image defines the format of the image, by specifying which two sides are top and bottom. As used herein, the term "format" means the identity of the vertical axis of the image. However, the vertical axis of the image does not specify which of the two sides is the top, thus the orientation of an image may remain unknown even when the format is known. Note in the case of the image in FIG. 3A, the y'-axis is the vertical axis of the image.

Figure 3B:
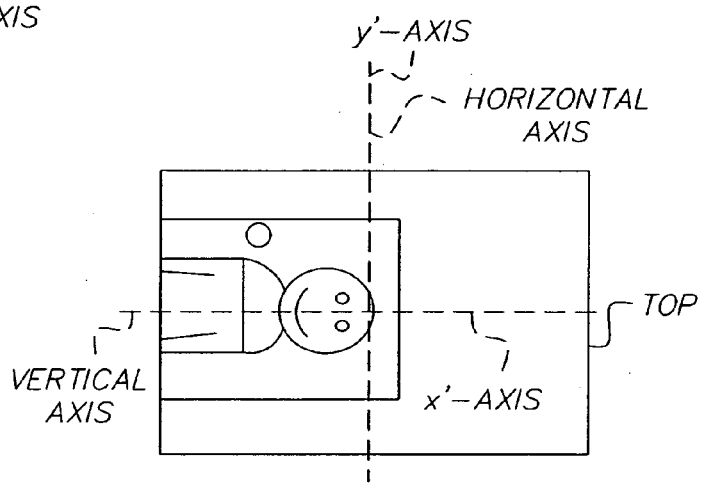
Figure 3C:
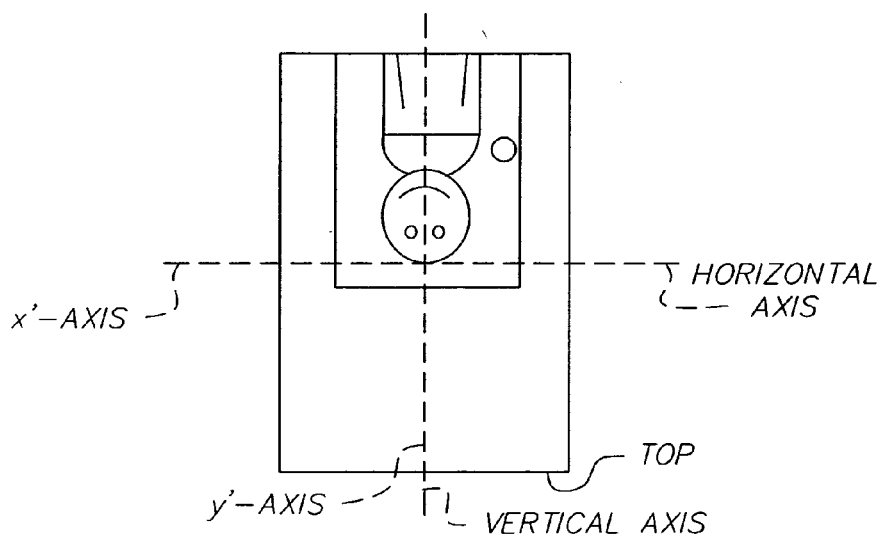

FIG. 3B shows an example where the top of the image is the right image side. In this example, the vertical axis of the image is the x'-axis. Finally, FIG. 3C shows an example image where, like the image in FIG. 3A, the vertical axis of the image is the y'-axis. However, in this example the top of the image lies on the negative y'-axis.

Figure 4A:
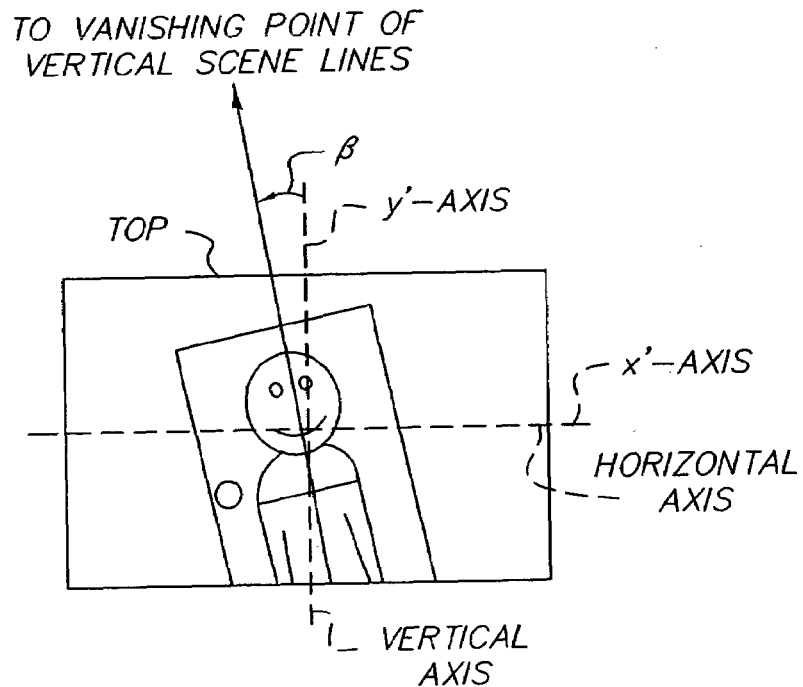
FIGS. 4A–B show the effects on an image as a result of small angle camera rotation.
Figure 4B:
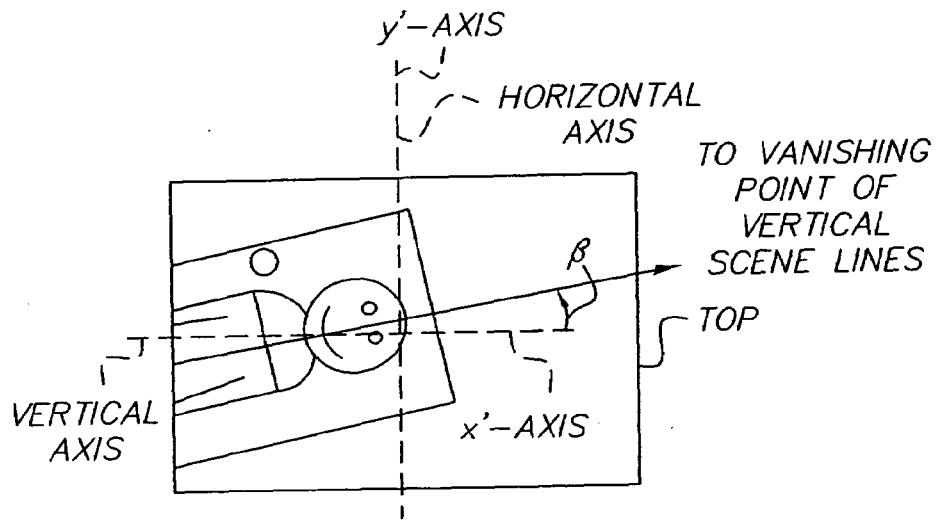

Note that if the camera is not held level at the time of image capture, then the image may appear to be tilted. That is, if the x-axis of the imaging system is not orthogonal to the vertical direction in the scene, then the image will appear to be tilted or rotated. Commonly, the amount of rotation is small since the photographer is making an effort to hold the camera level. For example, FIG. 4A shows an embodiment similar to that of FIG. 3A, except for the fact that a simulated amount of camera rotation is included. Additionally, FIG. 4B discloses an embodiment to that of FIG. 3B with the addition of camera rotation. It is possible to show that the amount of the camera rotation (the angle from the level position) is the same as the angle β that the image is rotated. As described herein, the vanishing point locations detected from the image allow for the identification of this angle.

Figure 5A:
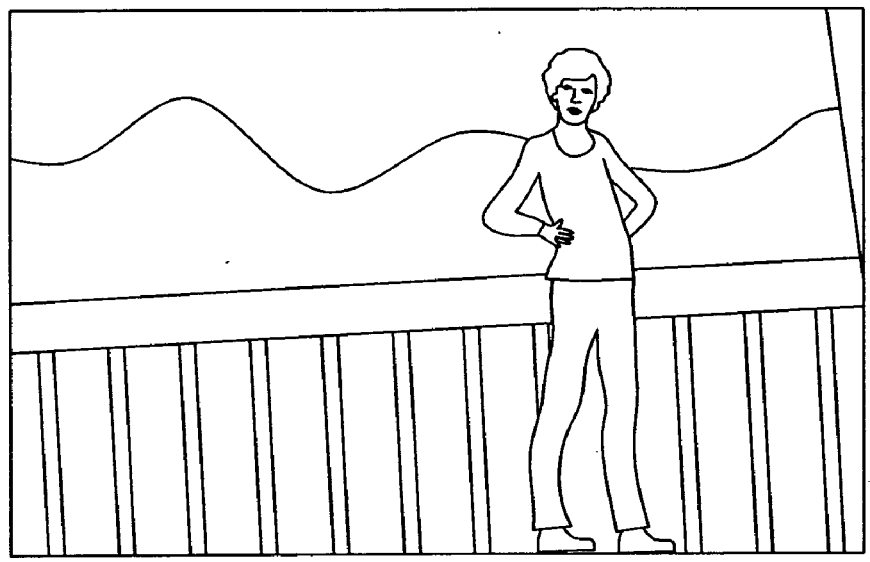
FIGS. 5A–B show an actual image that has been corrected by the method of this invention.
Figure 5B:
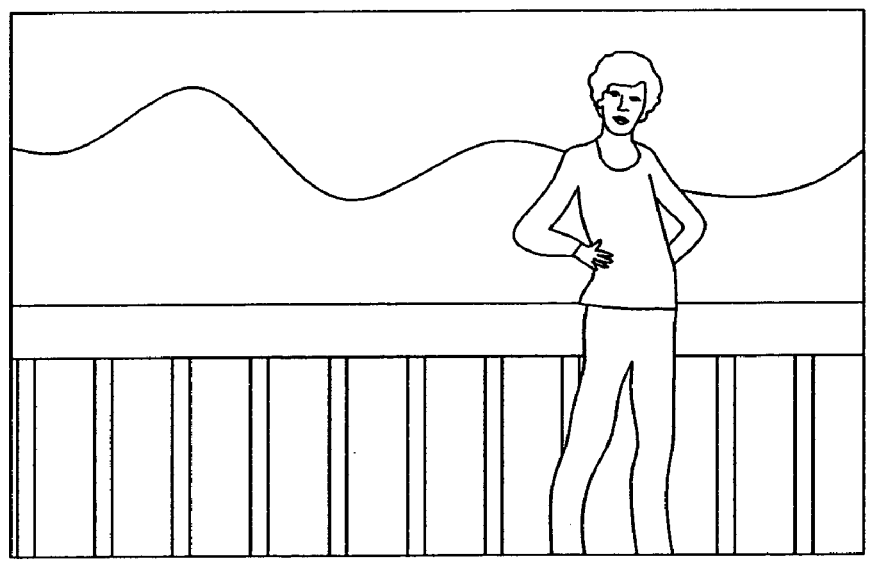

FIG. 5A shows an original image that has an apparent amount of camera rotation. The method of the present invention was applied to the original image and estimated that the amount of rotation of the original image in the counter-clockwise direction was 3.4 degrees. FIG. 5B shows the corrected image, generated by rotating FIG. 5A by 3.4 degrees in the clockwise direction. There is a noticeable improvement in the handrail orientation as a result of the processing of the present invention. In the case where the image transform 19 performs a rotation of the digital image, there may be additional logic based upon the value of β. For instance, if |β|<1 degree, performing a rotation correction may not produce a result noticeable enough to be worth the computational effort. Additionally, there may be an upper limit on the amount of rotation that the image transform 19 will execute. For example, if |β|=44 degrees, it may be advantageous that nothing is done to the image, as a modification of this magnitude may produce displeasing results if the value of β produced by the algorithm was incorrect. Another aspect of the invention has the image transform 19 performing a rotation by an amount of −β, the resulting image produced has a vanishing point on the vertical axis of the image (assuming that the value of β is correct). In this embodiment, the image transform 19 is a rotating transformation which operates by rotating the image. Such a transformation is a warping of the image, since the geometry of the image output from the image transform 19 has been modified relative to the geometry of the image input to the image transform 19. The location of the rotation candidate vanishing point $v_G$ of the image input to the image transform 19 is an undesirable vanishing point location, because it does not lie on the vertical axis of the image. The vertical axis of the image is considered to be a preferable vanishing point location. However, those skilled in the art will recognize that other preferable vanishing point locations may exist. For instance, infinity (or $z_G = 0$ in vanishing point vector notation) may be a preferable vanishing point location. In this case, the digital image may be modified by an image transform 19 designed to warp the image in such a manner that the image resulting from the image transform 19 has a vanishing point now located at infinity. Alternatively, another preferable vanishing point location may be at infinity and also on the vertical axis of the image (in this case, either $x_G$ or $y_G = 1$). Clearly, the vanishing point of the image output from the image transform 19 lies on the vertical axis of the image, and is therefore a preferable vanishing point location. Thus, the operation of the image transform 19 is to warp the image in such a fashion that a vanishing point associated with the input image migrates from an undesirable vanishing point location to a desirable vanishing point location in the image output from the image transform 19. Those skilled in the art of image processing will recognize that an image transform 19 may be created (either deterministically or empirically) to warp an image in such a manner as to relocate a vanishing point from an undesirable vanishing point location within the input image to a desirable vanishing point location within the resulting image.

Those skilled in the art will recognize that many variations may be made to the description of the present invention without significantly deviating from the scope of the present invention.

| PARTS LIST | |
| --- | --- |
| 2 | focal point |
| 3 | image plane |
| 4 | image origin |
| 12 | vanishing point detector |
| 13 | vanishing point selector |
| 14 | rotation detector |
| 19 | image transform |

What is claimed is:

1. A method of detecting an amount of rotation between the vertical axes of a scene and an image of the scene, comprising:
   a) detecting a set of vanishing points related to the image;
   b) selecting a set of vanishing points corresponding to a vertical axis of the scene based on a predetermined criteria, wherein the predetermined criteria is a threshold operation to select a vanishing point that is greater than a predetermined distance from the center of the image; and
   c) using the selected vanishing points to detect the rotation of the image.

2. The method claimed in claim 1, wherein the image has x' and y' axes and the predetermined criteria is:

$$|x_G| > T_1$$

OR $$|y_G| > T_1$$

where the vanishing points are represented by vanishing point vectors $v_G = (x_G, y_G, z_G)$ with relation to a Gaussian sphere located on a z-axis with respect to the image at a distance f away from the image plane, f representing an approximation of the focal length of a camera lens employed to photograph the image; and $T_1$, is a predetermined constant; and the rotation is determined by calculating the angles between an x or y axis of the Gaussian sphere and the selected vanishing point vectors and choosing the smallest angle as the rotation.

3. The method claimed in claim 2, wherein $0.3 < T_1 < 1$, and the angles between the y axis and the vanishing point vector are $$\gamma = \text{sign}(x_G y_G) \cos^{-1}(v_{Gxy} \cdot [0,1,0])$$

$$\gamma = \text{sign}(x_G y_G) \cos^{-1}(v_{Gxy} \cdot [0,-1,0])$$

and the angle between the x axis and the vanishing point vector is $$\gamma = \text{sign}(x_G y_G) \cos^{-1}(v_{Gxy} \cdot [1,0,0])$$

$$\gamma = \text{sign}(x_G y_G) \cos^{-1}(v_{Gxy} \cdot [-1,0,0])$$

where $$v_{Gxy} = \frac{[x_G, y_G, 0]}{\sqrt{x_G^2 + y_G^2}}$$

and $\text{sign}(x_G y_G)$ is 1 if the signs of $x_G$ and $y_G$ are similar and $\text{sign}(x_G y_G)$ is −1 if the signs of $x_G$ and $y_G$ are dissimilar.

4. A computer readable medium having computer executable instructions for performing the method of claim 2.

5. A computer readable medium having computer executable instructions for performing the method of claim 3.

6. The method claimed in claim 1, wherein the image has x' and y' axes and the predetermined criteria is:

$$|x_G| > T_1$$

OR $$|y_G| > T_1$$

where the vanishing points are represented by vanishing point vectors $v_G = (x_G, y_G, z_G)$ with relation to a Gaussian sphere located on a z-axis with respect to the image at a distance f away from the image plane, f representing an approximation of the focal length of a camera lens employed to photograph the image; and $T_1$, is a predetermined constant; and the rotation is determined by calculating the angles between an axis of the Gaussian sphere parallel to the vertical axis of the image and the selected vanishing point vectors and choosing the smallest angle as the rotation.

7. The method claimed in claim 6, wherein $T_1 = 0.5$.

8. A computer readable medium having computer executable instructions for performing the method of claim 6.

9. A computer readable medium having computer executable instructions for performing the method of claim 7.

10. A computer readable medium having computer executable instructions for performing the method of claim 1.

11. An apparatus for detecting an amount of rotation between the vertical axes of a scene and an image of the scene, comprising:
   a) means for detecting a set of vanishing points related to the image;
   b) means for selecting a set of vanishing points corresponding to a vertical axis of the scene based on a predetermined criteria, wherein the predetermined criteria is a threshold operation to select a vanishing point that is greater than a predetermined distance from the center of the image; and
   c) means for using the selected vanishing points to detect the rotation of the image.

12. The apparatus claimed in claim 11, wherein the image has x' and y' axes and the predetermined criteria is:

$$|x_G| > T_1$$

OR $$|y_G| > T_1$$

where the vanishing points are represented by vanishing point vectors $v_G = (x_G, y_G, z_G)$ with relation to a Gaussian sphere located on a z-axis with respect to the image at a distance f away from the image plane, f representing an approximation of the focal length of a camera lens employed to photograph the image; and $T_1$, is a predetermined constant; and the rotation is determined by calculating the angles between an x or y axis of the Gaussian sphere and the selected vanishing point vectors and choosing the smallest angle as the rotation.

13. The apparatus claimed in claim 12, wherein $0.3 < T_1 < 1$, and the angles between the y axis and the vanishing point vector are $$\gamma = \text{sign}(x_G y_G) \cos^{-1}(v_{Gxy} \cdot [0,1,0])$$

$$\gamma = \text{sign}(x_G y_G) \cos^{-1}(v_{Gxy} \cdot [0,-1,0])$$

and the angle between the x axis and the vanishing point vector is $$\gamma = \text{sign}(x_G y_G) \cos^{-1}(v_{Gxy} \cdot [1,0,0])$$

$$\gamma = \text{sign}(x_G y_G) \cos^{-1}(v_{Gxy} \cdot [-1,0,0])$$

where $$v_{Gxy} = \frac{[x_G, y_G, 0]}{\sqrt{x_G^2 + y_G^2}}$$

and $\text{sign}(x_G y_G)$ is 1 if the signs of $x_G$ and $y_G$ are similar and $\text{sign}(x_G y_G)$ is $-1$ if the signs of $x_G$ and $y_G$ are dissimilar.

14. The apparatus claimed in claim 13, wherein $T_1 = 0.5$.

15. The apparatus claimed in claim 11, wherein the image has x' and y' axes and the predetermined criteria is:

$$|x_G| > T_1$$

OR $$|y_G| > T_1$$

where the vanishing points are represented by vanishing point vectors $v_G = (x_G, y_G, z_G)$ with relation to a Gaussian sphere located on a z-axis with respect to the image at a distance f away from the image plane, f representing an approximation of the focal length of a camera lens employed to photograph the image; and $T_1$, is a predetermined constant; and the rotation is determined by calculating the angles between an axis of the Gaussian sphere parallel to the vertical axis of the image and the selected vanishing point vectors and choosing the smallest angle as the rotation.

* * * * *